No. 891,486. PATENTED JUNE 23, 1908.
M. LEITCH.
APPARATUS FOR TREATING TIN SCRAP.
APPLICATION FILED MAR. 26, 1908.
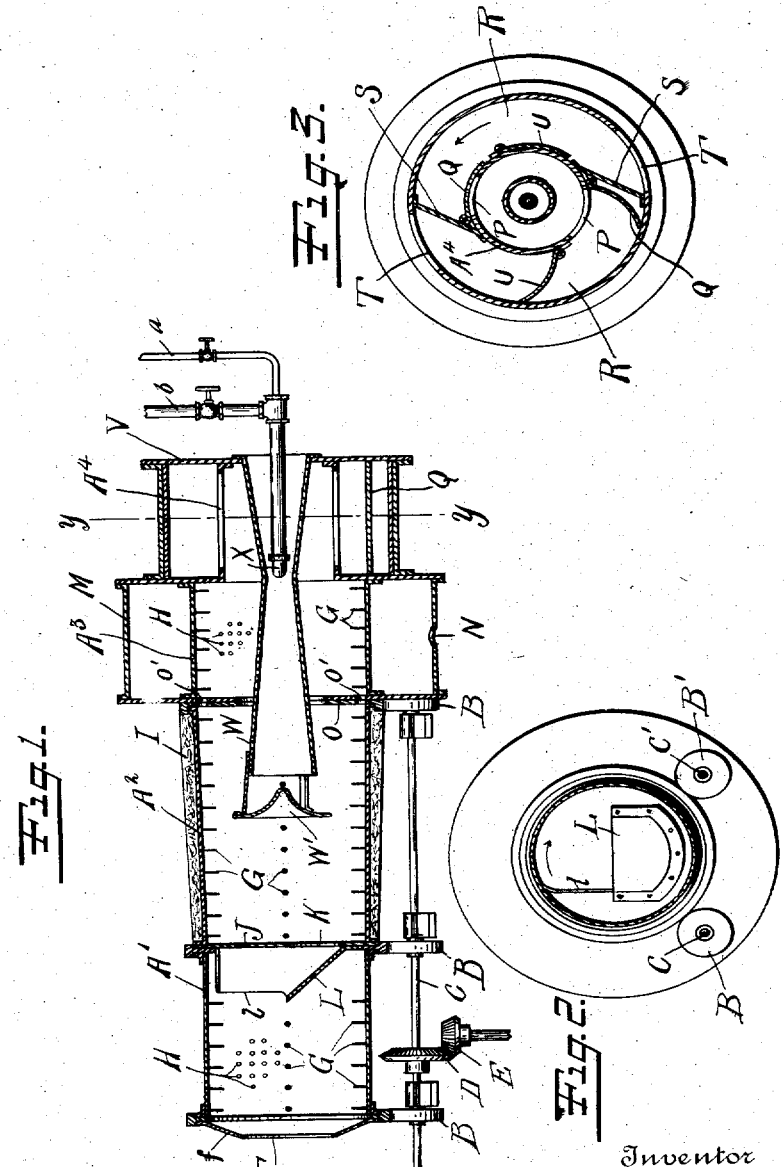
Inventor
MEREDITH LEITCH

UNITED STATES PATENT OFFICE.

MEREDITH LEITCH, OF SPRINGFIELD, MASSACHUSETTS, ASSIGNOR TO METAL PROCESS COMPANY, OF NEW YORK, N. Y., A CORPORATION OF NEW YORK.

APPARATUS FOR TREATING TIN-SCRAP.

No. 891,486.        Specification of Letters Patent.        Patented June 23, 1908.

Application filed March 26, 1908. Serial No. 423,375.

*To all whom it may concern:*

Be it known that I, MEREDITH LEITCH, a citizen of the United States, residing at Springfield, Hampden county, State of Massachusetts, have invented certain new and useful Improvements in Apparatus for Treating Tin-Scrap, of which the following is a full, clear, and exact description.

My invention relates to improvements in apparatus for treating tin scrap and the like, particularly tin scrap in the form of old tin cans, and has for its object to produce a simple, durable and efficient apparatus for cleaning the cans, removing the solder therefrom, separating the parts, collecting the solder and discharging the cans without unduly oxidizing the tin upon the scrap.

The following is a description of apparatus embodying my invention, in which

Figure 1 is a longitudinal section of the apparatus; Fig. 2 is a section on the line $x$—$x$ Fig. 1; Fig. 3 is a section on the line $y$—$y$ Fig. 1, looking toward the left.

Referring more particularly to the drawings, $A'$ $A^2$ and $A^3$ represents three cylinders constituting portions of a removable composite cylinder supported by wheels B—B' mounted on shafts C—C', one of which shafts is driven by any suitable mechanism such as bevel gears D—E. The composite cylinder composed of the parts $A'$ $A^2$ and $A^3$ reclines and its axis may be horizontal and preferably is approximately horizontal, as shown. The section $A'$ has an opening F through which the tins cans and the like are shoveled into that section. This section is provided with pins G projecting inwardly, which, as the apparatus revolves, lifts the cans so that they are raised and allowed to fall from a height, thus subjecting them to mechanical shocks. These pins are preferably separated from each other longitudinally by about six inches, and there are as many series of them as may be found desirable, the series being reduced in number in the drawing for the purpose of simplicity. The portion $A'$ is also provided with perforations H, so that it constitutes a screen for the purpose of screening out dirt and small particles which may be dislodged by the tumbling process.

The cylinder $A^2$ is constructed substantially like the cylinder $A'$, with the exception that it is longer in length and slightly tapered and has no perforations and therefore does not constitute a screen, and is surrounded by a covering I, which is a non-conductor of heat. The portion $A^3$ is also constructed similar to the portion $A'$ having both pins and perforations, but being somewhat shorter in length. Between the portions $A'$ and $A^2$ is a partition J, having a comparatively small or constricted opening K in front of which is a hopper L, one side $l$ of which is extended to the periphery of the cylindrical portion $A'$, the wall and hopper constituting a scoop. The apparatus revolves in the direction indicated by the arrow in Fig. 2, with the result that the extended portion $l$ lifts up the cans and causes them to flow down into the hopper L and through the opening K into the section $A^2$. The section $A^3$ is surrounded by a drum M, which has a small opening N. This drum collects the small particles of solder, together with any dirt which may have progressed thus far, which dirt and solder is gradually sifted out through the hole N as the cylinder revolves. Between the sections $A^2$ and $A^3$ is a circular wall or barrier O, which acts to dam back the cans somewhat so as to retain them in the section $A^2$ for a longer period than they would be retained if such wall were not present.

At the right hand end of the section $A^3$ is a chamber formed by a cylindrical wall $A^4$ having openings P—P, as indicated in Fig. 3. These openings are alternately opened and closed by valves Q—Q, an opening P being closed when it is at the top of the cylinder and open when it is at the bottom. They open into passages R—R, which are separated from each other by partitions S—S. The passages R—R have openings T—T, which permit the cans to drop out when those openings are at their lowermost positions. Between each opening P and its corresponding opening T is a valve U. Each valve U closes one of the passages R whenever the valve Q opening into that passage, is open. The action of the valves Q and U therefore results in preventing the free passage of air through the openings T and P, although permitting the discharge of the cans through those openings as the cylinder revolves.

Connected to the outer vertical wall V at the right hand end of the apparatus is a tubular burner W. This is preferably attached to the wall V so as to revolve therewith. At the left hand end of this burner is secured a distributer W' for directing the flames at the mouth of the burner so that they will be thrown toward the periphery of the cylindrical portion $A^2$. Within the burner is located the discharge nozzle X of an air and oil supply, of the ordinary type, controlled by suitable cocks, $a$ being the oil supply and $b$ being the gas supply, working on the well known atomizer principle. The discharge nozzle X of the oil and air system is located within the burner W and does not completely fill the same and thereby permits some air to be drawn in through the burner which does not pass through the air pipe $b$, it being found that a portion of the supply of air can be satisfactorily introduced in this manner, the amount of oil and air forced in being regulated through valves in the pipes $a\ b$. The entire surfaces of the sections $A'$ and $A^3$ are perforated, though for simplicity only a few perforations are shown.

The operation of the apparatus is as follows: The scrap to be treated is fed in through the opening F. The circular wall $f$ at the mouth of the opening causes the cans to heap up, and as they heap up and the cylinder is revolved, they gradually, on account of the accumulation, roll down toward the right hand end of the section $A'$. The dirt is largely shaken off and sifted out through the holes H during this period. When they reach the right hand end of the section $A'$, they are scooped up by the wall $l$ and dropped into the hopper L and passed through the opening K. They are forced to move along through the section $A^2$ in a manner similar to that in which they were forced to move along in the section $A'$, and while in this section are subjected to a heat from the burner W sufficient to melt the solder thereon. The flame produced by the burner W is regulated by the valves in the pipes $a\ b$, so that it is deoxidized or free from oxygen, and the atmosphere within the chamber $A^2$ is therefore a deoxidizing atmosphere. The wall J with the comparatively small opening K, assists very much in maintaining a deoxidizing atmosphere within the cylinder $A^2$, since it prevents air from entering into this section through the opening F and the portion $A'$. The opening K as well as the opening N are so small that they are entirely taken up with products of combustion passing outward through them. While the cans are in the section $A^2$, the solder is melted and the cans, being lifted up and dropped down, their portions are separated. The portions are retained in the section $A^2$ for a considerable period by the circular wall or barrier O, over which they must flow in order to enter the section $A^3$. When the cans reach the section $A^3$ they are subjected to a still further tumbling action and still more solder is dislodged, and the solder, together with any dirt which may reach the section $A^3$, is sifted through the holes in that section into the outer chamber, and, as the cylinder revolves, discharged through the opening N. The section formed by the cylindrical wall $A^4$ is of somewhat smaller diameter than the section $A^3$, on account of which the cans are delayed in their progress from the section $A^3$ to the section $A^4$, thereby insuring a thorough tumbling. When the cans pass from the section $A^3$ to the section $A^4$, they drop through one of the openings P in the discharge apparatus, and as the cylinder revolves are discharged through one of the openings T—T, but before being discharged they have been for some time removed from intense heat, and therefore are cooled down to a non-oxidizing temperature before they are exposed to the air, the result being that they are desoldered and separated without having the tin upon them oxidized, and are in a proper condition for being subjected to the action of any suitable detinning process. In the apparatus as actually used, the section $A'$ is about 42 inches in diameter and the other parts preferably have proportions about as shown. The apparatus operates satisfactorily when the cylinder is revolved at the rate of 20 revolutions per minute.

The apparatus above described is the preferred embodiment of my invention. It may, however, be modified in various ways without departing from the spirit thereof.

What I claim is:

1. In an apparatus for treating tin scrap, the combination with a reclining cylinder having a receiving opening at one end and a discharge opening at the other end, of means for creating a heated deoxidized atmosphere within said cylinder, a wall transverse to said cylinder having an opening discharging into said cylinder, and a scoop secured to said cylinder and discharging through said opening.

2. In an apparatus for treating tin scrap, the combination with a reclining cylinder having a receiving opening at one end and a discharge opening at the other end, of means for creating a heated deoxidized atmosphere within said cylinder, a wall transverse to said cylinder at one end having a constricted opening discharging into said cylinder and means for closing the discharge opening against the free passage of air or gases.

3. In an apparatus for treating tin scrap, the combination with a reclining cylinder having a receiving opening at one end and a discharge opening at the other end, of means for creating a heated deoxidized atmosphere within said cylinder, a wall transverse to said cylinder at one end having an opening discharging into said cylinder, a screening cylinder adjacent to said wall and a scoop adjacent to said opening and discharging therethrough, and a restraining wall at the other end of said heating apparatus for delaying the progress of the scrap through said cylinder and means for losing the discharge opening against the free passage of air or gases.

4. In an apparatus for treating tin scrap, the combination with a reclining cylinder having a receiving opening at one end and a discharge opening at the other end, of means for creating a heated deoxidized atmosphere within said cylinder, a wall transverse to said cylinder at one end having an opening discharging into said cylinder, and a restraining wall at the other end of said heating apparatus for delaying the progress of the scrap through said cylinder, said restraining wall having perforations along its base.

5. In an apparatus for treating tin scrap, the combination with a reclining cylinder having a receiving opening at one end and a discharge opening at the other end, of means for creating a heated deoxidized atmosphere within said cylinder, a wall transverse to said cylinder at one end having an opening discharging into said cylinder, a restraining wall at the rear of said heating apparatus for delaying the progress of the scrap through said cylinder, and screening cylinders adjacent to both ends of said heating cylinder.

6. In an apparatus for treating tin scrap, the combination with a reclining cylinder having a receiving opening at one end and a discharge opening at the other end, of means for creating a heated deoxidized atmosphere within said cylinder, a wall transverse to said cylinder at one end and having an opening discharging into said cylinder, a restraining wall at the other end of said heating apparatus for delaying the progress of the scrap through said cylinder, a screening cylinder adjacent to said other end of said heating cylinder, and a valve-controlled means for discharging the treated scrap from said screening cylinder.

7. In an apparatus for treating tin scrap, the combination of a cylindrical section provided with inward projections and with perforations, a heating section adjacent thereto, means for producing a heated deoxidized atmosphere within said heating section, a third section at the other end of said heating section also provided with inward projections and perforations, a transverse partition between said first two sections provided with an opening of relatively small dimensions, and a valve-controlled discharge section adjacent to said second screening section.

8. In an apparatus for treating tin scrap, the combination of a cylindrical section provided with inward projections and with perforations, a heating section adjacent thereto, means for producing a heated deoxidized atmosphere within said heating section, a third section at the other end of said heating section also provided with inward projections and perforations, a transverse partition between said first two sections provided with an opening of relatively small dimensions, a barrier between the second and third sections for delaying the progress of the material, and a valve-controlled discharge section adjacent to said second screening section.

9. In an apparatus for treating tin scrap, the combination of a cylindrical section provided with inward projections and with perforations, a heating section adjacent thereto, means for producing a heated deoxidized atmosphere within said heating section, a third section at the other end of said heating section also provided with inward projections and perforations, a transverse partition between said first two sections provided with an opening of relatively small dimensions, and a valve-controlled discharge section adjacent to said second screening section, and a scoop discharging from said first section to said second section through said opening.

MEREDITH LEITCH.

Witnesses:
A. MORFORD,
C. L. ROESCH.

---

It is hereby certified that in Letters Patent No. 891,486, granted June 23, 1908, upon the application of Meredith Leitch, of Springfield, Massachusetts, for an improvement in "Apparatus for Treating Tin-Scrap," an error appears in the printed specification requiring correction, as follows: In line 2, page 3, the word "losing" should read *closing;* and that the said Letters Patent should be read with this correction therein that the same may conform to the record of the case in the Patent Office.

Signed and sealed this 14th day of July, A. D., 1908.

[SEAL.]

E. B. MOORE,
*Commissioner of Patents.* progress of the scrap through said cylinder and means for losing the discharge opening against the free passage of air or gases.

4. In an apparatus for treating tin scrap, the combination with a reclining cylinder having a receiving opening at one end and a discharge opening at the other end, of means for creating a heated deoxidized atmosphere within said cylinder, a wall transverse to said cylinder at one end having an opening discharging into said cylinder, and a restraining wall at the other end of said heating apparatus for delaying the progress of the scrap through said cylinder, said restraining wall having perforations along its base.

5. In an apparatus for treating tin scrap, the combination with a reclining cylinder having a receiving opening at one end and a discharge opening at the other end, of means for creating a heated deoxidized atmosphere within said cylinder, a wall transverse to said cylinder at one end having an opening discharging into said cylinder, a restraining wall at the rear of said heating apparatus for delaying the progress of the scrap through said cylinder, and screening cylinders adjacent to both ends of said heating cylinder.

6. In an apparatus for treating tin scrap, the combination with a reclining cylinder having a receiving opening at one end and a discharge opening at the other end, of means for creating a heated deoxidized atmosphere within said cylinder, a wall transverse to said cylinder at one end and having an opening discharging into said cylinder, a restraining wall at the other end of said heating apparatus for delaying the progress of the scrap through said cylinder, a screening cylinder adjacent to said other end of said heating cylinder, and a valve-controlled means for discharging the treated scrap from said screening cylinder.

7. In an apparatus for treating tin scrap, the combination of a cylindrical section provided with inward projections and with perforations, a heating section adjacent thereto, means for producing a heated deoxidized atmosphere within said heating section, a third section at the other end of said heating section also provided with inward projections and perforations, a transverse partition between said first two sections provided with an opening of relatively small dimensions, and a valve-controlled discharge section adjacent to said second screening section.

8. In an apparatus for treating tin scrap, the combination of a cylindrical section provided with inward projections and with perforations, a heating section adjacent thereto, means for producing a heated deoxidized atmosphere within said heating section, a third section at the other end of said heating section also provided with inward projections and perforations, a transverse partition between said first two sections provided with an opening of relatively small dimensions, a barrier between the second and third sections for delaying the progress of the material, and a valve-controlled discharge section adjacent to said second screening section.

9. In an apparatus for treating tin scrap, the combination of a cylindrical section provided with inward projections and with perforations, a heating section adjacent thereto, means for producing a heated deoxidized atmosphere within said heating section, a third section at the other end of said heating section also provided with inward projections and perforations, a transverse partition between said first two sections provided with an opening of relatively small dimensions, and a valve-controlled discharge section adjacent to said second screening section, and a scoop discharging from said first section to said second section through said opening.

MEREDITH LEITCH.

Witnesses:
A. MORFORD,
C. L. ROESCH.

---

It is hereby certified that in Letters Patent No. 891,486, granted June 23, 1908, upon the application of Meredith Leitch, of Springfield, Massachusetts, for an improvement in "Apparatus for Treating Tin-Scrap," an error appears in the printed specification requiring correction, as follows: In line 2, page 3, the word "losing" should read *closing;* and that the said Letters Patent should be read with this correction therein that the same may conform to the record of the case in the Patent Office.

Signed and sealed this 14th day of July, A. D., 1908.

[SEAL.]

E. B. MOORE,
*Commissioner of Patents.*

It is hereby certified that in Letters Patent No. 891,486, granted June 23, 1908, upon the application of Meredith Leitch, of Springfield, Massachusetts, for an improvement in "Apparatus for Treating Tin-Scrap," an error appears in the printed specification requiring correction, as follows: In line 2, page 3, the word "losing" should read *closing;* and that the said Letters Patent should be read with this correction therein that the same may conform to the record of the case in the Patent Office.

Signed and sealed this 14th day of July, A. D., 1908.

[SEAL.]

E. B. MOORE,
*Commissioner of Patents.*